United States Patent
Krauer et al.

(10) Patent No.: US 9,366,374 B2
(45) Date of Patent: Jun. 14, 2016

(54) CLOSURE ELEMENT FOR BORES SUBJECTED TO INTERNAL PRESSURE

(75) Inventors: Jürg Krauer, Uster (CH); Beat Wüst, Zurich (CH)

(73) Assignee: KVT-KOENIG AG, Dietikon (CH)

( * ) Notice: Subject to any disclaimer, the term of this patent is extended or adjusted under 35 U.S.C. 154(b) by 0 days.

(21) Appl. No.: 14/239,619

(22) PCT Filed: Aug. 23, 2011

(86) PCT No.: PCT/EP2011/004225
§ 371 (c)(1),
(2), (4) Date: Mar. 21, 2014

(87) PCT Pub. No.: WO2013/026458
PCT Pub. Date: Feb. 28, 2013

(65) Prior Publication Data
US 2014/0224370 A1  Aug. 14, 2014

(51) Int. Cl.
| | |
|---|---|
| B65D 43/04 | (2006.01) |
| F16L 55/132 | (2006.01) |
| F16L 55/115 | (2006.01) |
| F16L 55/13 | (2006.01) |
| B65D 41/28 | (2006.01) |

(52) U.S. Cl.
CPC ............. *F16L 55/132* (2013.01); *F16L 55/115* (2013.01); *F16L 55/13* (2013.01)

(58) Field of Classification Search
CPC ........ F16L 55/132; F16L 55/115; F16L 55/13
USPC .......................................... 220/801, 789, 802
See application file for complete search history.

(56) References Cited

U.S. PATENT DOCUMENTS 3,105,621 A * 10/1963 Francis .......................... 222/498
3,279,643 A * 10/1966 Amesbury et al. ............ 220/234

(Continued)

FOREIGN PATENT DOCUMENTS

DE   3902500 A1   8/1980
EP   0970878 A1   1/2000

(Continued)

OTHER PUBLICATIONS

Abstract of DE 3902500.

*Primary Examiner* — J. Gregory Pickett
*Assistant Examiner* — Niki M Eloshway
(74) *Attorney, Agent, or Firm* — Brian Roffe

(57) ABSTRACT

A closure element serves for closing off bores which are subjected to internal pressure, preferably bores in engine or valve blocks or tanks. Said closure element has a sleeve-shaped main body which can be inserted into the bore and the outer circumference of which, in the installed state, bears sealingly against the inner surface (2) of the bore (3). Provided are the main body and an expanding body (4) which is connected to said main body by a bent-over transition region (8). The closure element is firstly inserted into the bore (3) and subsequently pressed into the latter by the application of pressure to the expanding body (4). As the closure element is pressed into the bore (3), the expanding body (4) is pushed into the main body (1) by deformation, so as to push the main body (1) in the radial direction against the inner surface (2) of the bore (3). In this way, said closure element can withstand even relatively high internal pressures and can be produced in a simple manner.

20 Claims, 4 Drawing Sheets

(56) References Cited

U.S. PATENT DOCUMENTS

| | | | |
|---|---|---|---|
| 3,380,610 A | 4/1968 | Krieps | |
| 4,227,625 A * | 10/1980 | Underwood | 220/789 |
| 6,296,136 B1 | 10/2001 | Huet | |
| 7,108,017 B2 * | 9/2006 | Kraus | 138/89 |
| 7,578,413 B2 * | 8/2009 | Kraus | 220/789 |
| 8,371,789 B2 * | 2/2013 | Takita | 411/508 |
| 2004/0151533 A1 | 8/2004 | Kraus | |
| 2006/0186130 A1 * | 8/2006 | Jatzke et al. | 220/789 |
| 2013/0312859 A1 | 11/2013 | Seiffert et al. | |
| 2013/0327769 A1 | 12/2013 | Wust et al. | |

FOREIGN PATENT DOCUMENTS

| | | |
|---|---|---|
| WO | 2009000317 A1 | 12/2008 |
| WO | 2013113327 A1 | 8/2013 |

\* cited by examiner

CLOSURE ELEMENT FOR BORES SUBJECTED TO INTERNAL PRESSURE

FIELD OF THE INVENTION

The invention relates to a closure element for bores subjected to internal pressure including a sleeve-shaped main body which can be inserted into the bore and that has an outer circumference which, in the installed state, rests against an inner surface of the bore to thereby form a seal.

BACKGROUND OF THE INVENTION

Such closure elements, which are also called expanders, can be used, for example, for closing off, such as to seal, bores in engine or valve blocks or also chemical containers. High pressures of up to 1,000 bar prevail in the inside of a motor or valve block, and this is why stringent demands are made of the production quality and the material properties of the closure element for closing off, such as to seal, bores in such engine or valve blocks.

A closure element for closing off, such as to seal, bores subjected to internal pressure is known from WO 2009/000317 A1. This closure element has a cylindrical main body provided for insertion into the bore to be closed off, said main body having an outwardly projecting supporting flange. Disposed within the cylindrical main body is an expanding body which on the one hand forms a cover for the bore and on the other hand presses the main body inserted into the bore against the inner surface of the bore in the radial direction. In the still uninstalled state the expanding body is connected to the main body by a predetermined breaking point. For sealed closing off of the bore the cylindrical main body is first of all positioned in the bore with the expanding body fastened to it by the predetermined breaking point and then the expanding body is pressed into the main body by applying pressure such as to shear off the predetermined breaking point so that the expanding body exerts a radial pressure on the inside wall of the main body and thus expands the latter and presses it, forming a seal, against the wall of the bore to be closed off.

OBJECTS AND SUMMARY OF THE INVENTION

Proceeding from here it is the object of the invention to further develop a generic closure element such that it can withstand even higher internal pressures and can be easily produced and inserted into the bore to be closed off.

According to the invention, this object is achieved by a closure element in which a main body includes a wall having a lower region and a bent transition region situated at an end of the lower region of this wall, an expanding body includes a substantially cylindrical wall having a first inside portion surrounded by the main body and a second outside portion not surrounded by the main body, and the main body and expanding body are configured to cause the expanding body to provide a radially outwardly directed pressing effect against the wall of the main body when the second outside portion of the cylindrical wall of the expanding body is in an installed position surrounded by the main body, the pressing effect causing the main body to press against the inner surface of the bore when the closing element is inserted into the bore and thereby form the seal between the main body and the inner surface of the bore, and by a method for sealing a bore subjected to internal pressure including the steps of inserting the closure element into the bore to cause an outer surface of the main body to be in contact with the inner surface of the bore and then applying inwardly directed pressure to the expanding body to cause the second outside portion of the cylindrical wall of the expanding body to be pressed into the main body and thus the second outside portion to exert a radially outward force against the main body which causes the main body to form a seal with the inner surface of the bore.

Preferred embodiments of the closure element and of the method can be gathered from the dependent claims.

The closure element according to the invention is characterised in that the expanding body is moulded onto the main body in one piece both before inserting the closure element into the bore and in the installed state. The connection of the expanding body to the main body is made here such that upon inserting the closure element into the bore to be closed off the expanding body can be pressed into the main body between the expanding body and the main body with plastic deformation of the connection region without the connection between the expanding body and the main body being broken. Depending on the elasticity of the material used the closure element according to the invention can also be drawn out of the bore again and be re-used.

Advantageously, the expanding body is made in the form of a cup and comprises a base which, in the inserted state of the closure element, forms a cover for the bore, and a cylindrical wall moulded onto the base. The main body is made in the form of a sleeve with a cylindrical wall onto which a radially outwardly projecting supporting flange is advantageously moulded by means of which the closure element can be supported on the wall surrounding the bore to be closed off.

In order to close off a bore subjected to internal pressure using the closure element according to the invention, the closure element is first of all inserted into the bore and is then pressed into the bore by applying pressure to the expanding body, which pressure can be applied manually or by means of a striking or pressing tool. The expanding body is thereby pressed into the main body with plastic deformation in particular of the transition region where the expanding body is moulded onto the main body and/or of a partial region of the expanding body. In this position the expanding body presses the main body in the radial direction against the inner surface of the bore, by means of which the closure element is held, forming a seal, in the bore.

Upon pressing the expanding element into the main body the one-piece connection between the main body and the expanding element is plastically deformed, but not broken, and so both before inserting the closure element into the bore to be closed off and after insertion the expanding element is and remains moulded onto the main body in one piece.

BRIEF DESCRIPTION OF THE DRAWINGS

Exemplary embodiments and further advantages of the invention are described in more detail below by means of the drawings. These show as follows.

DETAILED DESCRIPTION OF THE INVENTION

Figure 1A:
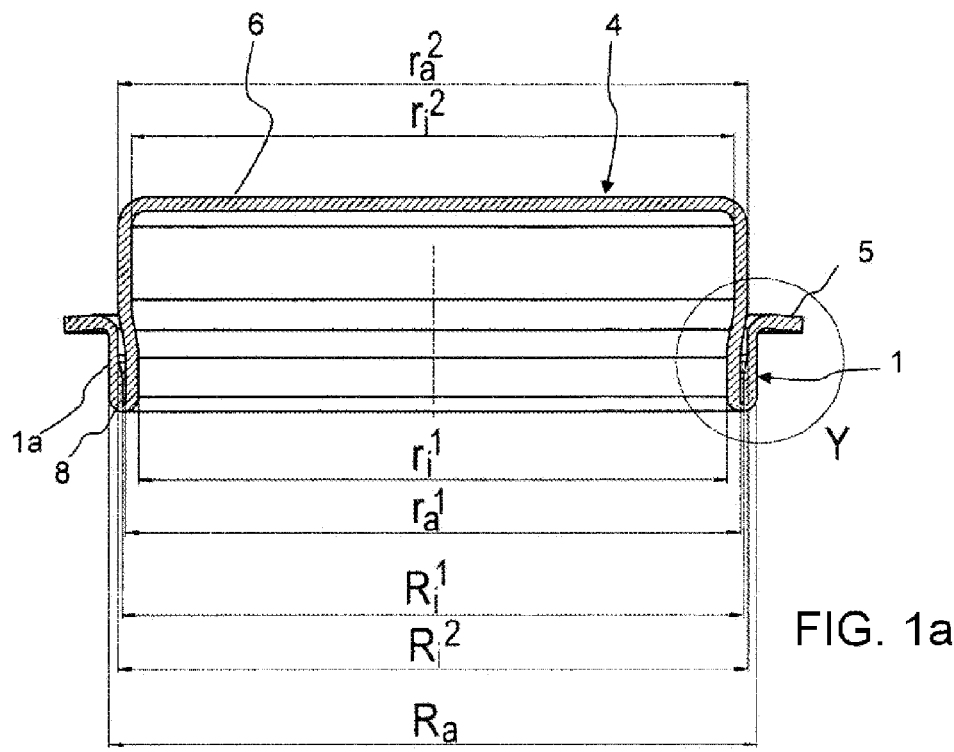
FIG. 1a is a section of a first exemplary embodiment of a closure element according to the invention in a still uninstalled state.
Figure 1B:
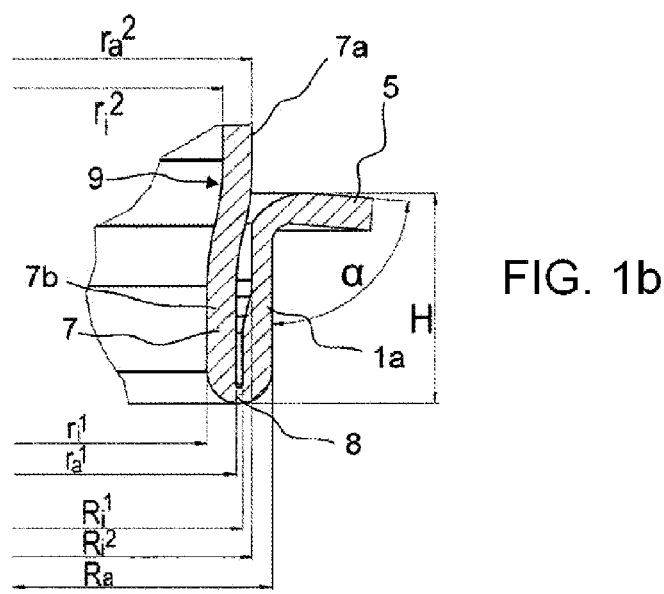
FIG. 1b is an enlarged portion of the transition region in which the expanding body is moulded onto the main element.
Figure 1C:
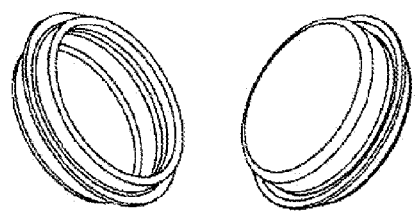
FIG. 1c shows two different perspective illustrations of the closure element.

The first exemplary embodiment of a closure element according to the invention shown in FIG. 1 comprises a sleeve-shaped main body 1 with a main body wall 1a. A radially outwardly projecting supporting flange 5 is moulded onto the upper end of the main body 1 on the wall of the latter in one piece. As can be seen from the detail view of FIG. 1b, the supporting flange 5 can be bent slightly downwards so that the angle α between the radially outer circumferential surface of the wall 1a and the lower side or the upper side of the supporting flange 5 running parallel to the latter is a little less than 90°, specifically for example α=85°.

As can be seen from FIG. 1b, the thickness of the wall 1a of the main body 1 increases in steps from the supporting flange 5 downwards. The increase in the thickness of the wall 1a of the main body 1 can also take place continuously (for example conically). By means of the increase in the thickness of the wall 1a the internal diameter $R_i$ of the main body 1 is reduced from a greater value $R_i^2$ in the upper region to a smaller value $R_i^1$ in the lower region. The outside diameter $R_a$ of the main body remains substantially constant here over the entire height H.

The lower end of the wall 1a of the main body 1 is bent radially inwards and in the bent region forms a transition region 8. A wall 7 is moulded onto the wall 1a of the main body 1 in one piece in this transition region 8. The transition region 8 is formed here such that the moulded on wall 7 is bent by 180° with respect to the wall 1a and extends upwards running substantially parallel to the wall 1a. The cylindrically formed wall 7 is a component part of an expanding body 4 which, as well the wall 7, comprises a base 6 moulded onto the latter in one piece. The expanding body 4 is therefore made substantially in a cup shape, with the base 6 in the upper region and the cylindrical wall 7 adjoining the latter towards the bottom. The wall 7 is sub-divided into two portions by a transition 9, specifically an upper, outside portion 7a and a lower, inside portion 7b. The thickness of the wall 7 is approximately the same in the outside portion 7a and in the inside portion 7b. The inside diameter $r_i^1$ of the inside portion 7b is smaller here than the inside diameter $r_i^2$ of the outside portion 7a, and correspondingly the outside diameter $r_a^1$ of the lower, inside portion 7b is smaller than the outside diameter $r_a^2$ of the outside portion 7a. The outside diameter $r_a^1$ of the lower, inside portion 7b of the expanding body 4 is slightly smaller here than the inside diameter $R_i^1$ of the wall 1a of the main body 1. The lower, inside portion 7b of the expanding body 4 thus reaches into the main body 1. The outside diameter $r_a^2$ of the upper, outside portion 7a of the expanding body 4 is made to be slightly larger than the largest inside diameter $R_i^1$ of the wall 1a of the main body 1.

Figure 2A:
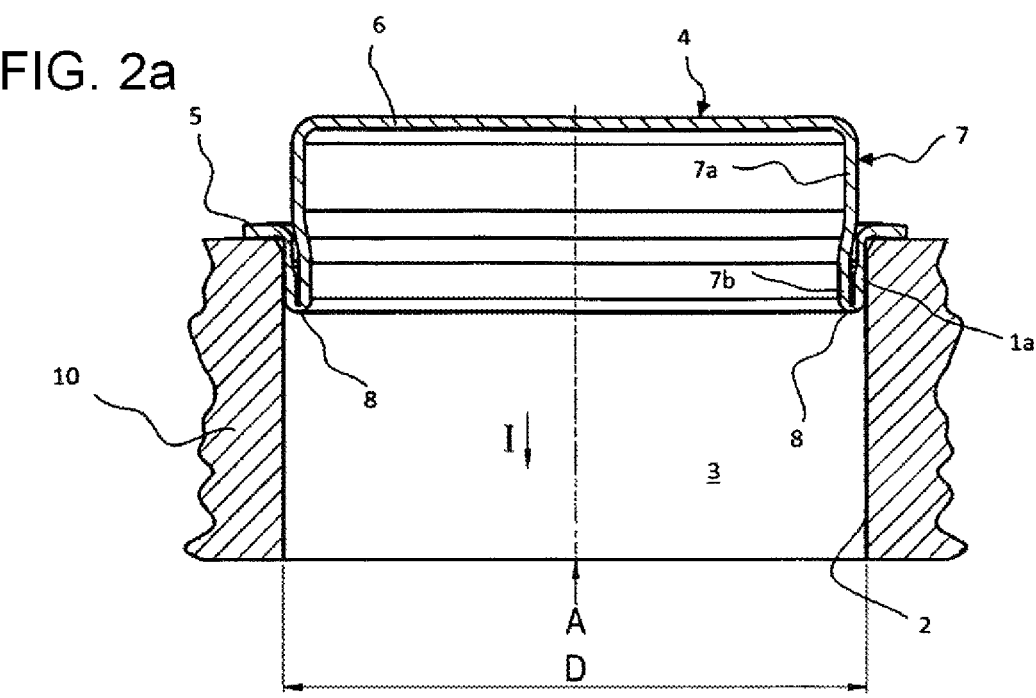
FIG. 2a is a longitudinal section of the closure element according to FIGS. 1a-1c during fitting.

In order to insert the closure element shown in FIG. 1 into a bore 3 to be closed off—as shown in FIG. 2a—the closure element is first of all inserted (loosely) into the bore, the supporting flange 5 being supported on the wall 10 surrounding the bore. The outer circumference (outside diameter $R_a$) of the main body 1 lies close and preferably without any play against the inner surface 2 of the bore 3. The outside diameter $R_a$ of the main body 1 is advantageously chosen such that it is slightly smaller than the diameter D of the bore 3. With a diameter of the bore 3 of for example D=22 mm, the outside diameter $R_a$ of the main body 1 is for example 21.9 mm.

Figure 2B:
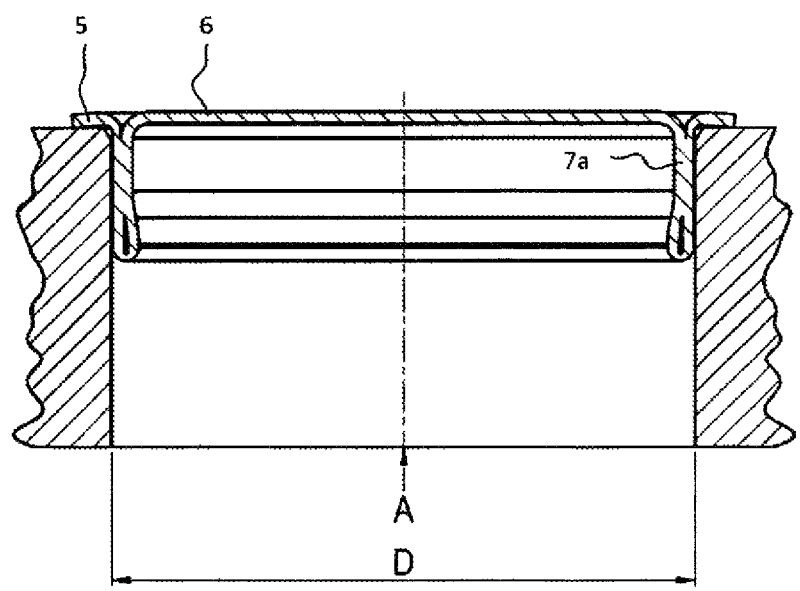
FIG. 2b is a longitudinal section of the closure element in the fitted state.

In order to press the closure element, pressure-tight, within the bore 3, the closure element is brought into the position shown in FIG. 2b by pressing the expanding body 4 into the main body 1. Due to the effect of the force applied to the base 6 of the expanding body 4 in direction I of the inside of the bore 3 (see FIG. 2a), the transition region 8 deforms first of all by the lower, inside region 7b of the wall 7 of the expanding body 4 being moulded onto the wall 1a of the main body 1 that is bent radially inwards.

In the fitted state of the deformation, which is shown in FIG. 2b, the expanding body 4 is pressed fully into the main body 1 so that the surface of the base 6 ends flush with the upper side of the flange 5. The lower, inside portion 7b of the wall 7 is bent here by plastic deformation and pressed downwards in direction I of the inside of the bore 3. By pressing the expanding body 4 into the main body 1 the upper, outside portion 7a of the expanding body 4 in the pressed in state (FIG. 2b) comes into contact with the inner surface (i.e. the inside diameter $R_i^1$) of the lower portion of the wall 1a of the main body 1 which forms the smallest inside diameter $R_i$ of the main body 1. Since the outside diameter $r_a^2$ of the upper portion 7a of the expanding element 4 is larger than the inside diameter $R_i^1$ of the main body 1, in this position the expanding element 4 presses the wall 1a of the main body 1 outwards in the radial direction against the inner surface 2 of the bore 3, by means of which the closure element is held securely in the bore 3, forming a seal.

Upon pressing the expanding body 4 into the main body 1, the form of the upper, outside portion 7a of the expanding body remains stable, whereas the lower, inside portion 7b of the expanding body and the transition region 8, onto which the wall 7 of the expanding body 4 is fastened onto the wall 1a of the main body 1, is plastically deformed. However, the one-piece connection of the expanding body 4 on the main body 1 is not separated in this way, as is the case with the closure element of WO 2009/000317 A1.

Figure 3A:
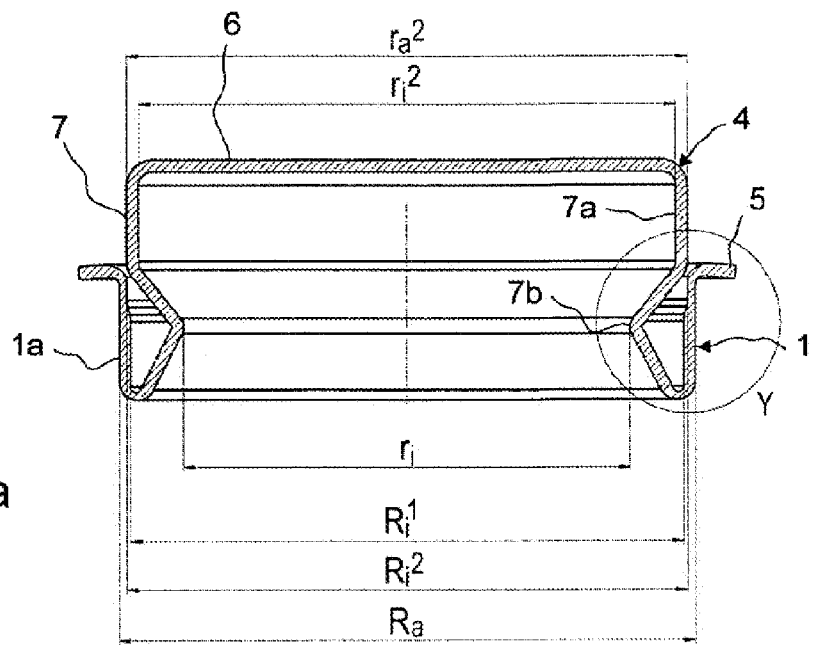
FIG. 3a is a section of a second exemplary embodiment of a closure element according to the invention in the still uninstalled state.
Figure 3B:
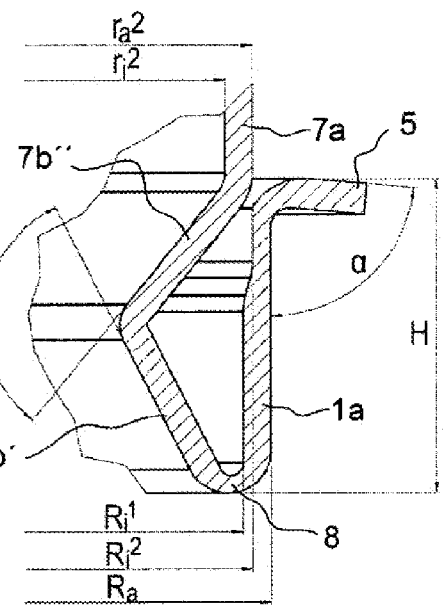
FIG. 3b is an enlarged portion of the transition region in which the expanding body is moulded onto the main element.
Figure 3C:
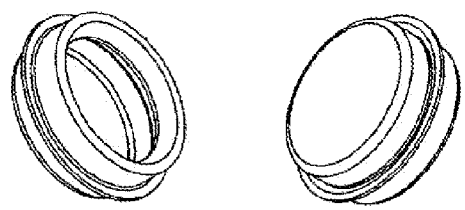
FIG. 3c shows two different perspective illustrations of the closure element.

The closure element of the exemplary embodiment of FIG. 3 essentially only differs from the closure element according to FIG. 1 in the form of the transition region 8 in which the expanding body 4 is moulded onto the main body 1. Otherwise the same reference numbers are used.

Unlike in the closure element according to FIG. 1, the transition region 8 in this exemplary embodiment has a triangular cross-section, as can be seen in particular in FIG. 3b. The lower end of the wall 1a of the main body 1 is obtuse-angled and bent pointing radially inwards so as to form the transition region 8. However, in this exemplary embodiment the lower end of the wall 1a is not bent by 180° (as in the exemplary embodiment of FIG. 1), but only by an obtuse angle of less than 180°. In the exemplary embodiment shown in FIG. 3 the angle by which the lower end of the wall 1a is bent radially inwards is approx. 115°. Other bend angles of between 90° and 180° are possible here.

At the bent transition region 8 the lower, inside portion 7b of the expanding body 4 adjoins the bent end of the wall 1a in one piece. Differently from the exemplary embodiment of FIG. 1, in the exemplary embodiment shown in FIG. 3 this lower, inside portion 7b of the expanding body 4 is angular in form with a lower arm 7b' and an upper arm 7b''. The two arms 7b' and 7b'' enclose an obtuse angle β of approx. 115°. The outside portion 7a of the expanding body 4 then adjoins the upper end of the upper arm 7b". As in the exemplary embodiment of FIG. 1, the whole closure element with its expanding body 4 and the main body 1 is formed in one piece. The transition region 8 where the expanding body 4 is moulded onto the main body 1 and the lower, inside portion 7b of the expanding body 4 are made to be plastically deformable.

As in the exemplary embodiment of FIG. 1, in the exemplary embodiment of FIG. 3 too the outside diameter $r_a^2$ of the upper, outside portion 7a of the expanding body 4 is (slightly) larger than the inside diameter $R_i^1$ of the main body 1.

Figure 4A:
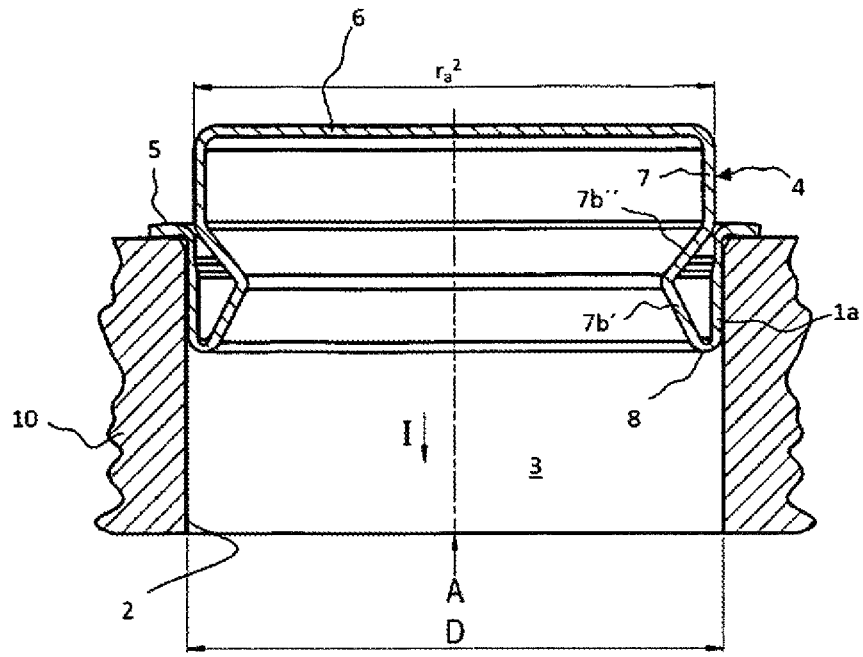
FIG. 4a is a longitudinal section of the closure element according to FIGS. 3a-3c during fitting.

Like the closure element of FIG. 1, the closure element of FIG. 3 is pressed into the bore 3. The pressing in process is shown in two steps in FIG. 4. In the first step the closure element is first of all inserted (loosely) into the bore 3, the supporting flange 5 being supported against the wall 10 surrounding the bore 3. In the second step (FIG. 4b) the expanding body 4 is then pressed into the main body 1 by applying pressure until the upper side of the base 6 ends flush with the upper side of the supporting flange 5. Upon pressing the expanding body 4 into the main body 1 the transition region 8 and the angular lower portion 7b (with the arms 7b' and 7b") of the expanding body 4 deform. At the same time the upper, outside portion 7a of the expanding body 4 comes to rest against the inner surface of the wall 1a of the main body 1. Due to the larger outside diameter $r_a^2$ of the upper outside portion 7a of the expanding body in comparison to the smaller inside diameter $R_i^1$ of the wall 1a of the main body, the pressed in expanding body 4 exerts a radially outwardly effective pressing force upon the wall 1a of the main body 1 and so presses the main body 1 against the inner surface 2 of the bore, forming a seal.

Figure 4B:
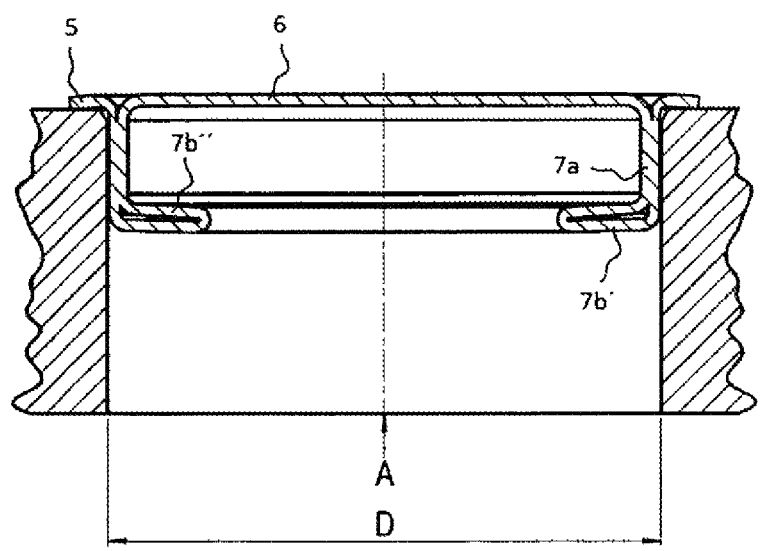
FIG. 4b is a longitudinal section of the closure element in the fitted state.

Upon pressing the expanding body 4 into the main body 1, in particular the angular connection region between the lower arm 7b' and the upper arm 7b" of the lower inside portion 7b of the expanding body 4 deforms into the final position shown in FIG. 4b. In this final position the two arms 7b' and 7b" of the inside portion 7b lie one on top of the other and bent by 180°, as shown in FIG. 4b. The upper outside portion 7a, which runs substantially parallel to the longitudinal axis A of the bore 3, then encloses approximately a right angle with the upper arm 7b". By bending the two arms 7b' and 7b" of the inside portion 7b of the expanding body 4, the radial pressing force, which the expanding body 4 exerts upon the main body 1a, is further strengthened.

In both exemplary embodiments of the invention the components of the closure element can be produced in one piece from metal by a deep drawing process or as an injection moulded part, preferably made of plastic. Advantageously, the closure elements according to the invention are produced from a metal, such as for example stainless steel or aluminium, and provided with a coating. When producing the closure elements from plastic, reinforcement with glass fibres is possible. Depending on the elasticity of the material of the closure element, the deformation can also take place elastically and plastically or purely elastically. The closure elements according to the invention can be used for closing off bores subjected to pressure having a diameter in the range of 15 mm to 60 mm and a standard operating pressure of between 5 and 100 bar.

The invention is sufficiently displayed by the exemplary embodiments described above. It is possible, for example, to provide the cylindrical wall 1a of the main body 1 with cut-outs, slots or windows on the outside, at any point, in order to improve the anchoring in the bore. Furthermore, for this purpose the outer surface of the main body can be provided with a friction-increasing coating or with elevations such a teeth, knurls or similar.

The cross-sectional form of a closure element can also differ from the round shape described here. Thus, for example, square or rectangular cross-sectional shapes are also conceivable.

In principle the closure element could also be made in a number of parts, the base 6, for example, being able to be made of a more stable or lower grade material.

Furthermore, the closure element could in principle also be provided with one or a number of filter-like openings so that there is air or liquid permeability, but solid particles, for example, are retained.

The invention claimed is:

1. A closure element for closing off a bore subjected to internal pressure, comprising:
   a sleeve-shaped main body adapted for insertion into the bore,
   an expanding body having a cup shape and comprising a base at a top of said expanding body and a substantially cylindrical wall connected to a bottom of said base, said base forming a cover for the bore when said main body is inserted into the bore, and
   a bent transition region connected on an outer side to said main body and on an inner side to said cylindrical wall of said expanding body;
   said main body being configured such that when inserted into the bore, a cylindrical wall of said main body extending upward from said bent transition region has an outer circumferential surface that rests in its entirety against an inner surface of the bore,
   said bent transition region being situated relative to said main body such that when said main body is inserted into the bore, said bent transition region is inside of the bore and entirely surrounded by a part of the inner surface of the bore against which the outer circumferential surface of said cylindrical wall of said main body rests,
   said cylindrical wall of said expanding body having a first inside portion surrounded by said main body prior to insertion of said main body into the bore and a second outside portion not surrounded by said main body prior to insertion of said main body into the bore; and
   wherein said main body and said expanding body are configured to cause said expanding body to provide a radially outwardly directed pressing effect against said cylindrical wall of said main body when said second outside portion of said cylindrical wall of said expanding body is surrounded by said main body in an installed position of the closure element in the bore, the pressing effect causing said main body to press against the inner surface of the bore when said closing element is in the bore and thereby form a seal between said main body and the inner surface of the bore.

2. The closure element according to claim 1, wherein said main body and said expanding body are a one piece unit.

3. The closure element according to claim 1, wherein said main body includes a radially outwardly projecting supporting flange moulded onto said main body.

4. The closure element according to claim 3, wherein a thickness of said cylindrical wall of said main body increases in an inward direction continuously or in steps from said supporting flange to said bent transition region.

5. The closure element according to claim 1, wherein said bent transition region is situated relative to said main body such that when said main body is inserted into the bore, said bent transition region is entirely surrounded by the part of the inner surface of the bore that is alongside and radially outward of said bent transition region.

6. The closure element according to claim 1, wherein said first inside portion has a constant outer diameter which is less than an inner diameter of said cylindrical wall of said main body and said second outside portion has a constant outer diameter greater than said inner diameter of at least part of said cylindrical wall of said main body, said cylindrical wall of said expanding body further comprising a transition between said first inside portion and said second outside portion.

7. The closure element according to claim 1, wherein said cylindrical wall of said expanding body is moulded in one piece onto said sleeve-shaped main body, said bent transition region being made deformably.

8. The closure element according to claim 7, wherein when said second outside portion of said cylindrical wall of said expanding body is in the position surrounded by said main body, said cylindrical wall of said main body is bent at an obtuse angle and said cylindrical wall of said expanding body is moulded onto said cylindrical wall of said main body as a one piece unit.

9. The closure element according to claim 1, wherein said cylindrical wall of said expanding body further comprises a transition that sub-divides said cylindrical wall of said expanding body into said second outside portion and said first inside portion, an outside diameter of said second outside portion being larger than an outside diameter of said first inside portion, an inside diameter of said second outside portion being larger than an inside diameter of said first inside portion, said first inside portion and said second outside portion having the same thickness.

10. The closure element according to claim 1, wherein said main body has a first, upper section with a first inside diameter and a second, lower section with a second inside diameter smaller than the first inside diameter, and the outside diameter of said second outside portion is larger than the second inside diameter of said second, lower section of said main body, an outside diameter of said main body being the same for the first, upper and second, lower sections.

11. The closure element according to claim 1, wherein said second outside portion has a constant outer diameter greater than an inner diameter of said cylindrical wall of said main body.

12. The closure element according to claim 1, wherein any parts of the element are provided with cut-outs, slots, or windows.

13. The closure element according to claim 1, wherein an outer surface of said main body is provided at least partially with a friction-increasing coating and/or with elevations.

14. The closure element according to claim 1, wherein said cylindrical wall of said main body has a substantially constant outer diameter over a height from said bent transition region to an upper end region of said cylindrical wall of said main body.

15. The closure element according to claim 1, wherein said main body includes a supporting flange projecting radially outward from an upper end region of said cylindrical wall of said main body, said cylindrical wall of said main body having a substantially constant outer diameter over a height from said bent transition region to said flange.

16. The closure element according to claim 1, wherein said main body and said expanding body are configured to cause the closure element to be retained in the bore only as a result of said second outside portion of said cylindrical wall of said expanding body providing a radially outwardly directed pressing effect against said cylindrical wall of said main body when said second outside portion of said cylindrical wall of said expanding body is in the installed position surrounded by said main body.

17. A method for sealing a bore subjected to internal pressure using a closure element according to claim 1, the bore having a depth whereby the bent transition region at an end of the closure element is above a bottom of the bore in the installed position of the closure element in the bore, the method comprising:
  inserting the closure element into the bore until the outer circumferential surface of said main body is entirely in contact with the inner surface of the bore and the bent transition region is inside of the bore and surrounded in its entirety by the inner surface of the bore such that the bent transition region is alongside part of the inner surface of the bore; and then
  applying inwardly directed pressure to said expanding body to cause said expanding body to deform and said second outside portion of said cylindrical wall of said expanding body to be pressed into said main body and thus said second outside portion to exert a radially outward force against said main body which causes said main body to form a seal with the inner surface of the bore,
  whereby the bore has a depth such that said main body and said first inside portion of said cylindrical wall of said expanding body are in contact with the inner surface of the bore in the installed position of the closure element in the bore.

18. The method according to claim 14, wherein upon pressing the closure element into the bore, said first inside portion of said expanding body is pressed by deformation axially towards an inside of the bore and/or radially towards a longitudinal axis of the bore.

19. The method according to claim 14, wherein upon pressing the closure element into the bore, said second outside portion of said expanding body is pressed axially towards an inside of the bore while maintaining its shape so that said second outside portion of said expanding body exerts a contact pressure acting outwardly in a radial direction upon said main body.

20. The method according to claim 14, wherein upon pressing said expanding body into said main body, a one-piece connection between said main body and said expanding body deforms elastically or plastically, but is not broken.

* * * * *